(12) United States Patent
Nott et al.

(10) Patent No.: US 6,324,556 B1
(45) Date of Patent: Nov. 27, 2001

(54) PERSONAL FINANCE ORGANIZER

(76) Inventors: Michael J. Nott; Shirley Nott, both of 92 Mill Street, Orangeville, Ontario (CA), L9W 2M7

( * ) Notice: Subject to any disclaimer, the term of this patent is extended or adjusted under 35 U.S.C. 154(b) by 0 days.

(21) Appl. No.: 09/184,635

(22) Filed: Nov. 3, 1998

Related U.S. Application Data

(60) Provisional application No. 60/064,120, filed on Nov. 3, 1997.

(51) Int. Cl.[7] .................................................. G06F 3/00
(52) U.S. Cl. ........................................ 708/140; 705/41
(58) Field of Search ............................... 708/140; 705/41

(56) References Cited

U.S. PATENT DOCUMENTS

| | | |
|---|---|---|
| 4,587,409 | 5/1986 | Nishimura et al. . |
| 4,719,338 | 1/1988 | Avery et al. . |
| 4,722,065 * | 1/1988 | Ogawa .................................. 708/140 |
| 5,021,952 | 6/1991 | Nishimura et al. . |
| 5,272,319 | 12/1993 | Rey . |
| 5,983,249 * | 11/1999 | Kimura ................................ 708/140 |

FOREIGN PATENT DOCUMENTS 2557993   7/1985   (FR) .

* cited by examiner

Primary Examiner—Tan V. Mai

(57) ABSTRACT

An apparatus for organizing data associated with each of a plurality of cards comprising a microcontroller, memory for storing said data associated with each said card, selecting means for selecting data from said memory associated with each said card, input means wherein said input means communicates with said microcontroller to store data to said memory for each said card and track changes to said data for each said card, in a first operable position when each said card is in a retracted position respectively.

17 Claims, 9 Drawing Sheets

PERSONAL FINANCE ORGANIZER

This application claims benefit of provisional application 60/064,120, filed Nov. 3, 1997.

Field of Invention

This invention relates generally to a personal finance organizer for accessing, processing, and storing data related to at least one financial card, having an improved selecting means for accessing, retrieving and processing financial information related said financial card.

BACKGROUND OF ART

A "cashless" financial environment has resulted from the widespread use of financial cards such as ATM ("Automated Teller Machine") cards, credit cards, and the like, in order to facilitate financial transactions. The average person now has a number of such financial cards.

The current norm in "cashless" financial transactions is the use of "non-smart" cards, i.e. cards having no memory or logic devices embedded therein. Such "non-smart" cards only contain information for initiating a debit or charge process with a financial services provider through use of a computer network, but do not provide means for accessing financial information such as pertinent credit or debit balances without access to such a computer network.

Consequently, in order to be able to access up-to-date financial information, including credit and debit balances, means have been provided for recording financial transactions effected using a plurality of financial cards and then storing the same in a memory, and accessing up-to-date financial data from said memory at a later date.

For example, U.S. Pat. No. 4,857,409 provides for an electronic book-keeping devices comprising an input keyboard having a plurality of input keys for the entry of the amount of money to be paid for the purchase made by using each of a plurality of credit cards, a storage means for storing charges one for each credit card, and means for updating the charge associated with one of the cards used. This electronic bookkeeping device also includes means for sequentially displaying the charges associated with the respective credit cards at the time of entry of the amount of the money in the order from the highest charge down to the smallest charge so that, in the case where the charge displayed is found not exceeding the credit line and the amount of the charge plus the amount of purchase if found appropriately balancing with the charges of the other credit cards, one for the credit cards which is associated with the charge displayed can be selected. Means for selecting data to a particular financial card are provided by particular keys on the device's input keyboard.

U.S. Pat. No. 5,272,319 teaches a memory holder for a financial card which provides a compartment for holding one financial card, calculator, and memory for processing and storing transactions related to same financial card. This memory holder also provides a warning means for reminding the user of this device to record any new transaction once the financial card has been re-inserted in the device.

It is an object of this invention to provide for a simple and effective electronic device for accessing, processing, and storing financial data related to a plurality of financial cards comprising an input means, memory, selecting means, and microcontroller. The selecting means in particular provides a simple and easy-to-use interface with the memory.

The electronic devices of the type referred to above are only useful if they are used each time the financial cards are used in a financial transaction. Otherwise, financial data becomes inaccurate immediately, and updating past financial transactions generally requires waiting for bank statements or obtaining an account update through various means, and inputting any financial transaction not previously recorded in the device. Updating financial data in such devices is further aggravated by the fact that there is generally a data time lag even in regard to the most up-to-date data available from financial service providers.

For such an electronic device to be used regularly, it is essential that it be very easy to use, and that its operation mirror as closely as possible the normal use of financial cards: when the user desires to make a purchase, a financial card is removed from its holder, the card is used to process the financial transaction, and then the card is returned to the holder. If all that is required to operate such an electronic device is to record such transaction before returning the financial card to its compartment, the electronic device is likely to be used regularly. Conversely, if additional steps are required to access data relating to the financial cards, in order to then record a particular financial transaction, the electronic device is more likely not to be used regularly, resulting in stale data that needs to be updated.

DISCLOSURE OF INVENTION

It is a first aspect of this invention to provide for an apparatus for organizing data associated with each of a plurality of cards comprising a microcontroller, memory for storing said data associated with each said card, selecting means for selecting data from said memory associated with each said card, input means wherein said input means communicates with said microcontroller to store data to said memory for each said card and track changes to said data for each said card, in a first operable position when each said card is in a retracted position respectively.

In accordance with yet another aspect of the invention, to provide for an apparatus for accessing, processing, and storing data related to a plurality of financial cards comprising a calculator further comprising: (i) a display and (ii) circuit for performing mathematical functions; memory comprising a plurality of data structures for storing data associated with said plurality of financial cards; selecting means for selecting one of said data structures; circuit connection; and microcontroller; wherein said calculator, memory, selecting means, and microcontroller are operably associated by means of said circuit connection; said selecting means, microcontroller, and circuit connection present means for accessing financial data stored in one of said data structures and displaying the same on said display; and said calculator, microcontroller, memory and circuit connection present means for performing mathematical functions using said financial data stored in one of said data structures, displaying the financial data resulting from said mathematical functions on said display, and storing said financial data in the originating data structure.

In accordance with still another aspect of the invention, to provide for an apparatus for accessing, processing, and storing data related to a plurality of financial cards comprising: a body; compartment for storing a plurality of financial cards comprising a plurality of slots disposed within said compartment for slidably receiving said plurality of financial cards; calculator comprising: (i) a display; and (ii) circuit for performing mathematical functions; memory comprising a plurality of data structures for storing data associated with said plurality of financial cards; selecting means for selecting one of said data structures disposed within said slots and engageable by said financial cards comprising: (i) a contact pin; (ii) plurality of contact arms disposed in said slots; and (iii)spring mechanism; wherein said contact arms, contact pin, and spring mechanism are operably associated and present means for engaging said contact pin when one of said financial cards is slidably removed from one of said slots; circuit connection; and microcontroller; wherein said calculator, memory, selecting means, and microcontroller are disposed within said body and are operably associated by means of said circuit connection, and said selecting means when engaged by said financial cards commands said microcontroller by means of said circuit connection to access financial data stored in one of said data structures and to display the same on said display; and said calculator, microcontroller, memory and circuit connection present means for performing mathematical functions using said financial data stored in one of said data structures, displaying the financial data resulting from said mathematical functions on said display, and storing said financial data in the originating data structure.

In accordance with a further aspect of the invention, to provide for a process a method for processing and accessing data comprising: slidably inserting a plurality of financial cards into a body, said compartment disposed in a body, said compartment comprising a plurality of slots; selecting one of a plurality of data structures comprising a memory by means of a selecting means, circuit connection, and microcontroller; inputting financial data related to said plurality of financial cards into one of said data structures by means of a input means, circuit connection, and microcontroller; and accessing financial data related to said plurality of financial cards from one of said data structures by means of said selecting means, circuit connection, memory, and microcontroller by retracting one of said plurality of cards from said compartment.

BEST MODE FOR CARRYING OUT THE INVENTION

Figure 1:
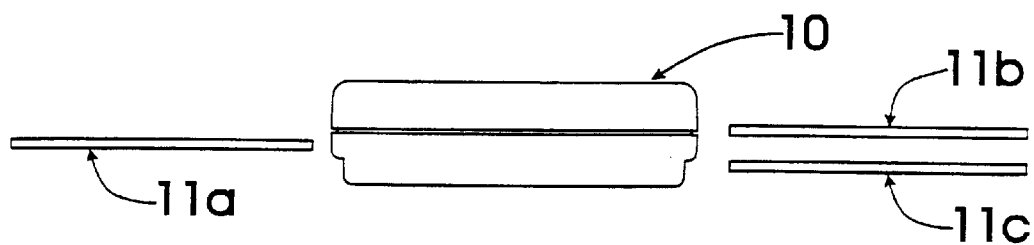
FIG. 1 is a top end view of the device for accessing, processing, and storing financial data.

In the description which follows, like parts are marked throughout the specification and the drawings with the same respective reference numerals. The drawings are not necessarily to scale and in some instances proportions may have been exaggerated in order to more clearly depict certain features of the invention.

FIG. 1 shows a top plan view of the a device for accessing, storing, and processing financial information which according to the present invention comprises a generally rectangular plate-like body 10 having a liquid crystal display ("LCD") 12 and key pad or input means 14.

The key pad 14 of the embodiment of the invention showed in FIG. 1 includes ten numeric keys (0 to 9) and four function input keys.

Input keys for two arithmetic functions only are provided for, namely addition ("+" key) and sub traction ("−" key). However, the personal finance organizer and its constituent parts could easily be adapted to include additional arithmetic functions as well, such as multiplication and division, and additional keys could be added to key pad 14 to provide input means for such additional functions.

The remaining two function keys relate to an entry clearing function presented by the "C" key 20, where "C" stands for "Clear" for clearing one particular entry; and a balance clearing function presented by the "C/B" key 22 where "C/B" stands for "Clear Balance".

Figure 2:
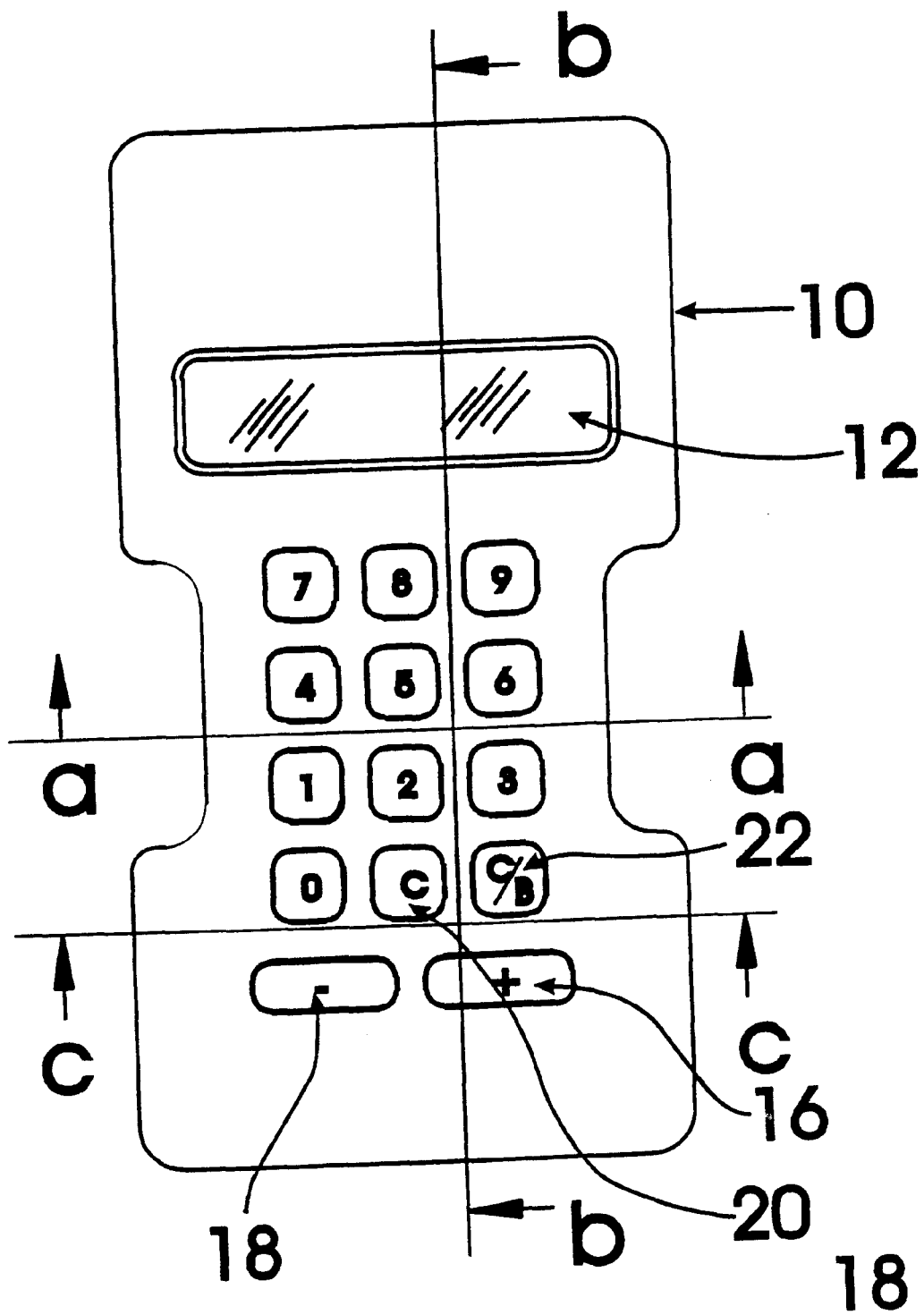
FIG. 2 is a top plan view of the device.
Figure 3:
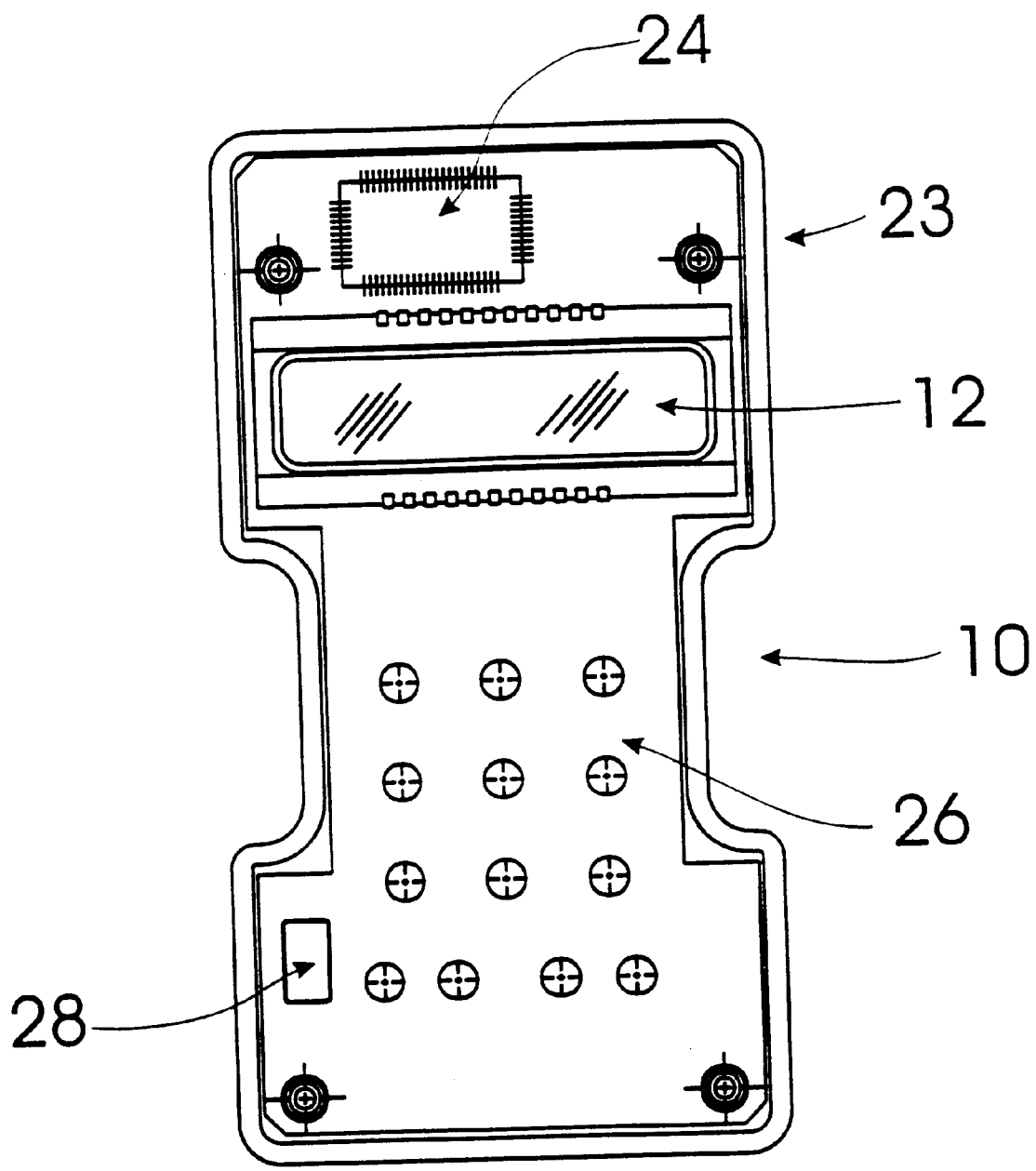
FIG. 3 is a top plan view of the device with the cover removed.
Figure 4:
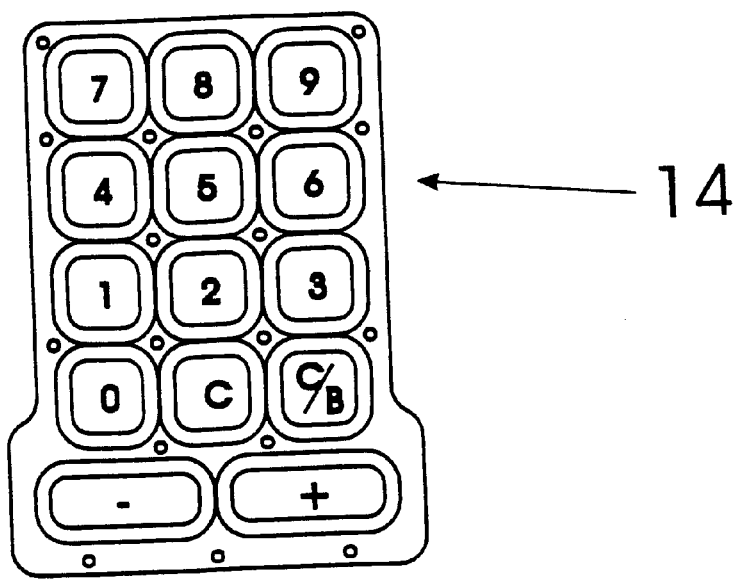
FIG. 4 is a top plan view of the key pad.
Figure 5:
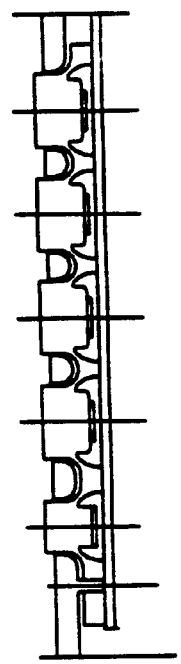
FIG. 5 is a side view of the key pad.
Figure 6:
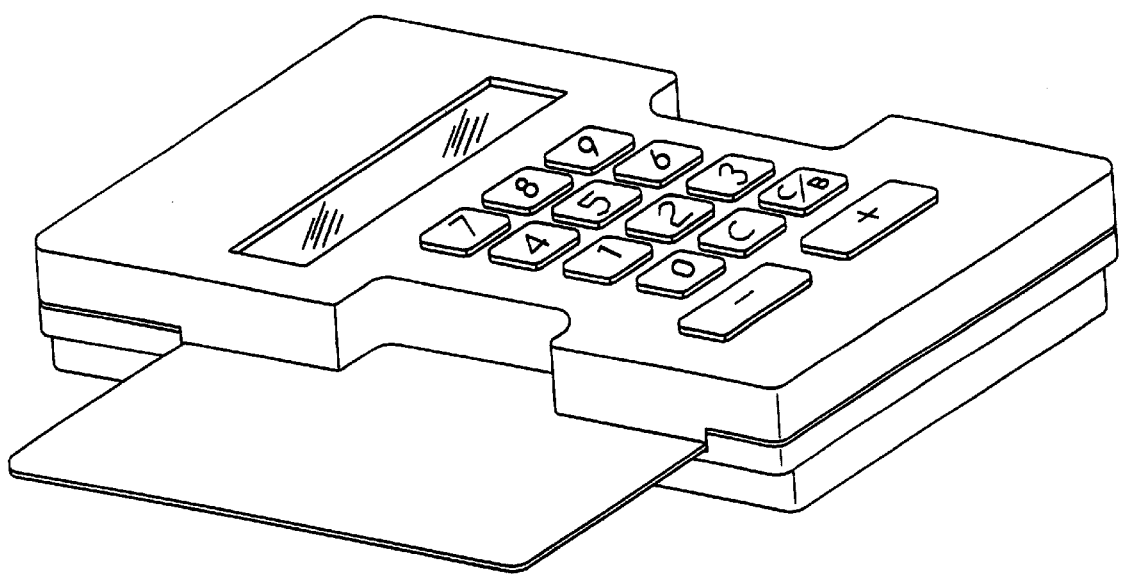
FIG. 6 is a perspective view of the device.
Figure 7:
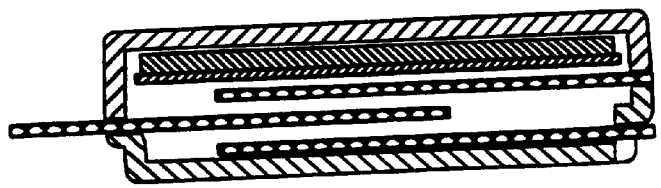
FIG. 7 is a first cross-sectional view of the device along the line c—c of FIG. 2.
Figure 8:
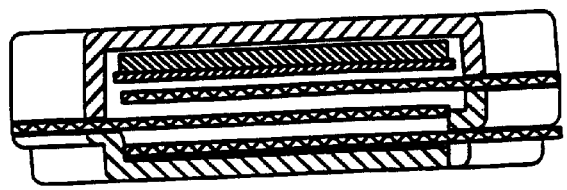
FIG. 8 is a second cross-sectional view of the device along the line a—a of FIG. 2.
Figure 9:
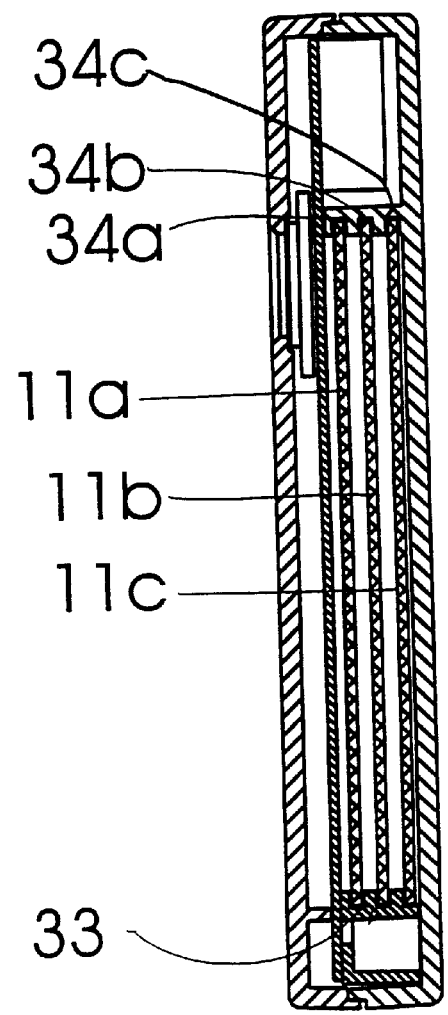
FIG. 9 is a third cross-sectional view of the device along line b—b of FIG. 2.
Figure 10:
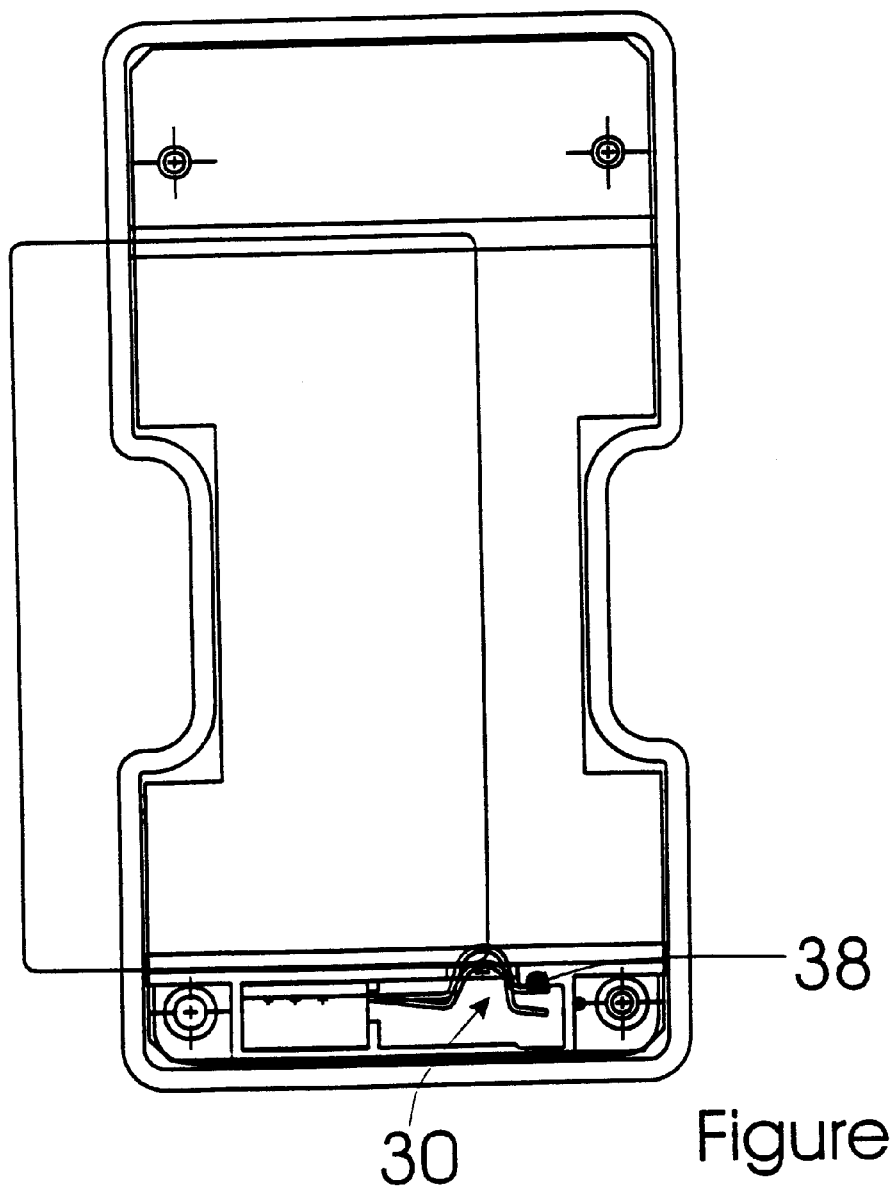
FIG. 10 is a top plan view of the interior of the device.
Figure 11:
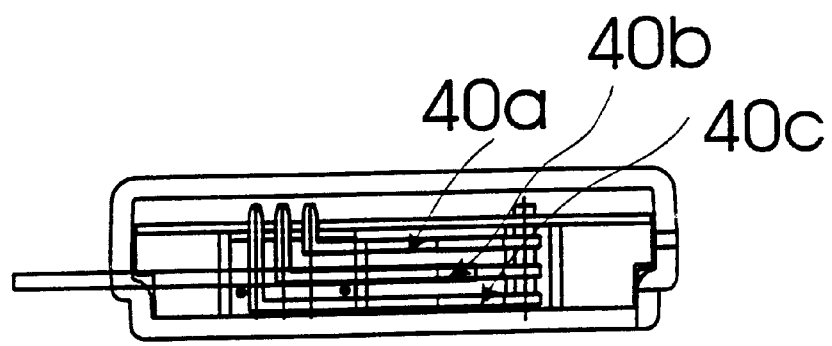
FIG. 11 is a representative view of the selecting means taken from the top.
Figure 12:
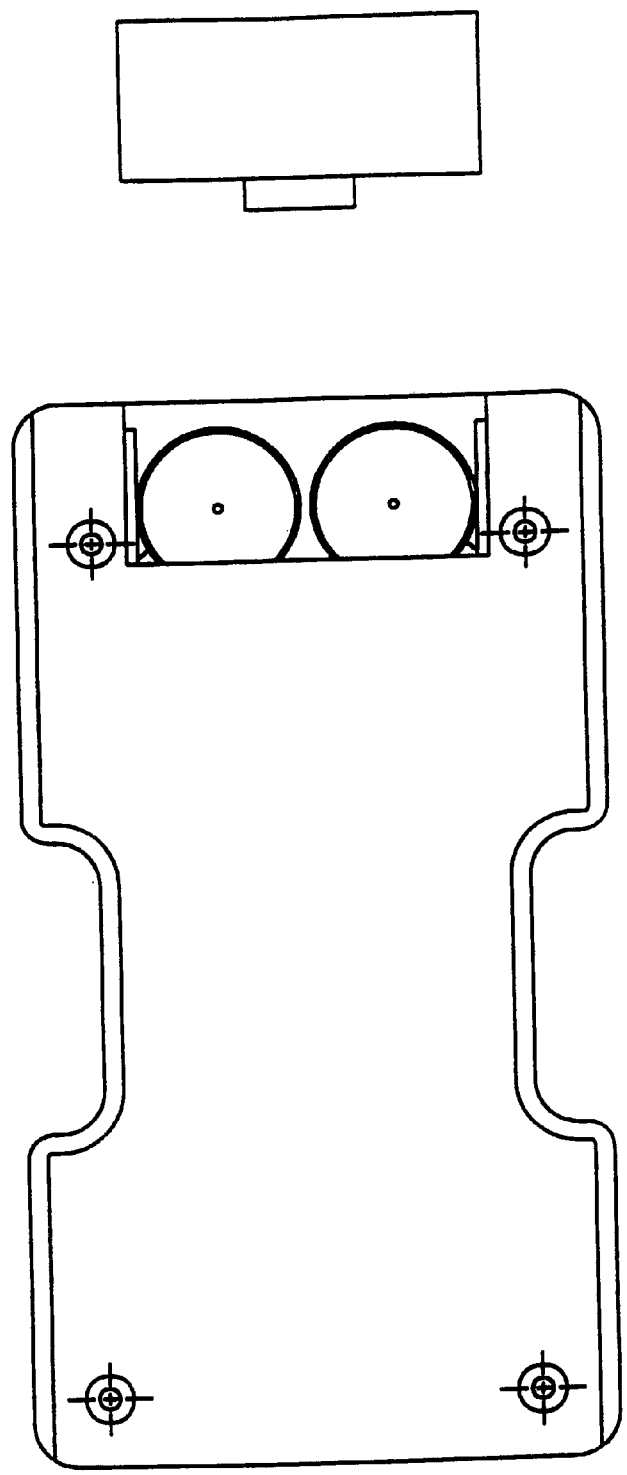
FIG. 12 is a back view of the device with the battery cover removed.
Figure 13:
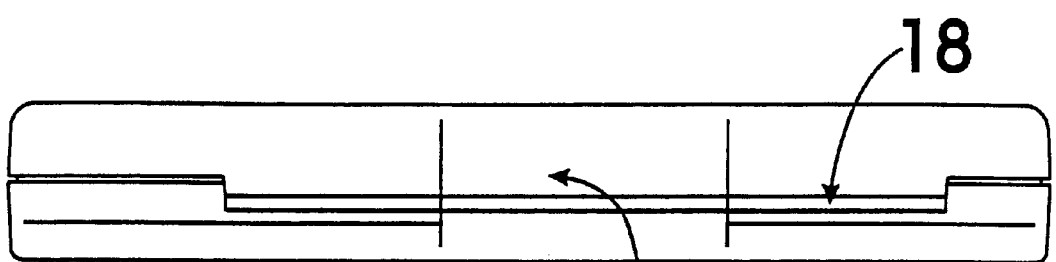
FIG. 13 is a left side view of FIG. 6.
Figure 14:
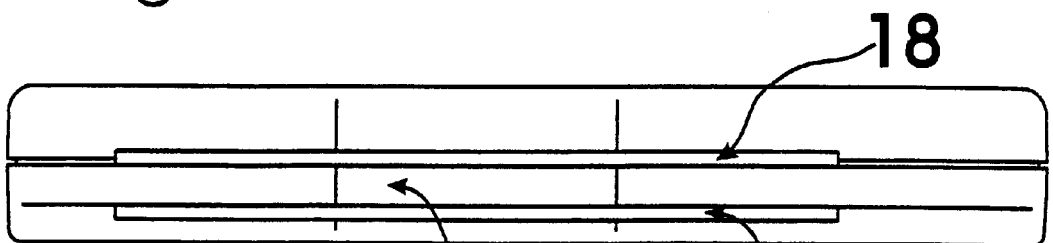
FIG. 14 is a right side view of FIG. 6.

FIG. 2 shows the key circuit elements of the main controller board 23 of the personal finance organizer, with the exception of the selecting means 30 which is best shown in FIGS. 10 and 11. FIG. 2 shows the LCD 12, microcontroller 24, key pad circuitry 26, and card sensors 28.

The microcontroller 24 has the following integrate d components: input-output interface, LCD controller/driver, reset circuit, and watch dog timer.

Microcontroller 24 provides a number of input-output ports which can be configured in a manner well-known in the art to provide for the requisite microcontroller input-output interface. The input-output interface comprises ports for interfacing with the card sensors 28, key pad 14, and LCD 12. Specifically, in regard to the key pad 14, the preferred embodiment of the invention described herein provides for an "External Interrupt" input pin which provides the microcontroller 24 with the input from the card sensors 28 that more than one of the plurality of financial cards 11a 11b 11c have been removed from the body 10.

An LCD controller/driver can be selected for generating specific display modes. The LCD controller/driver used in the preferred embodiment generates a ¼ duty (⅓ bias) display mode.

The microcontroller 24 also provides a watchdog timer used to reset the microcontroller 24 in the event of an incorrect program operation.

A circuitry connection between the main controller board 23 and microcontroller 24, contact sensors 28, LCD 14, key pad 12, and selecting means 30 is provided, in a manner well known in the art. Specifically in regard to the key pad 12, the keys of the same have carbon disks to close a circuit between the key pad 12 and the main controller board 23.

The LCD 14 provided for is a standard six and a half digit display with seven segments organized as sixteen columns. The LCD 14 is also electrically connected with the main controller board 23 and microcontroller 24, in a manner well known in the art. The LCD can also be provided with means for designating each of cards 11a 11b 11c to indicate in regard to which of such cards data is being accessed. In the preferred embodiment, a triangle, square, and circle displayed on LCD 14 refer to each of cards 11a 11b 11c.

The functioning of the microcontroller 24 is ensured by its association with software contained in internal ROM and ROM, in a manner well-known in the art. In particular, the internal ROM comprises firmware program code and constant data, and the internal RAM comprises program variables and configuration data.

The RAM is further divided into a first RAM bank and a second RAM bank. The first RAM bank comprises program variables, and the second RAM bank is used for stack and working registers.

The first RAM bank used in the preferred embodiment comprises the following program variables: (1) data structures used to keep track of time in the program, counters, and time event flags; (2) data structures for providing key pad, LCD, and card sensor interfaces; (3) data structures for mathematical routines; (4) system management routine variables; and (5) card data structures.

Specifically in regard to the system management routine variables contained in the first RAM bank, in the preferred embodiment this routine also includes sub-routines for establishing an "ERROR" where an overflow or a card error occurs. An overflow occurs on the positive side if the numeric input is greater than 1999999, or on the negative side if it is less than −1999999. A card error occurs when the card sensors receive input that more than one card has been removed from the compartment. In both cases, an "ERROR" message is displayed.

The stack and working registers included in the second RAM bank comprise standard routines well-known in the art, namely (1) main loop routines, (2) mathematical routines, (3) timer interrupt routines, (4) and card interrupt routines.

In the preferred embodiment disclosed herein, the body contains three pairs of corresponding slots 34a 34b 34c, as best seen in FIG. 11, which are adjacent to the top 31 and the bottom 33 of the body 10. These slots 34a 34b 34c are adapted to have the measurements required for slidably receiving three financial cards 11a 11b 11c. The personal finance organizer, with the necessary modifications to its constituent elements, can be adapted to contain more or less than three such slots 34a 34b 34c.

The selecting means 30 is disposed in these slots 34a 34b 34c. In the preferred embodiment described herein, and as best shown in FIG. 11, the selecting means 36 comprises a contact pin 38 for establishing a circuit connection with the main controller board 23, and further comprises three contact arms 40a 40b 40c disposed in one of each of said pairs of slots 34a 34b 34c. Said contact arms 40a 40b 40c are flexible. A spring load is applied to each of said contact arms toward the centre of the body. This spring load is either provided by said contact arms 40a 40b 40c being resistant to bending, or an external spring mechanism associated with the contact arms 34a 34b 34c, in a manner well known in the art.

As a result of the structure described, when a financial card 11 is inserted into one of said pairs of slots 34a 34b 34c, the contact arm disposed inside such slot is engaged and therefore the contact portion of the contact arm is forced away from the contact pin 38. When the same financial card is then removed from the same pair of slots, the same contact arm is pushed back toward the contact pin 38 by the spring load referred to above, so as to contact the contact pin 38 and thereby establish a connection with the main control board 23, and thereby the microcontroller 24.

When the personal finance organizer is used for the first time, or when one card 11 is changed for a new one, the microcontroller initiates the "Card Initialization Routine" whereby card-specific data specific values are input and stored in the RAM. Specifically, the "Card Initialization Routine" results in the following data being stored in the card data structures in regard to each financial card: (1) card balance/remaining credit; (2) card credit limit; (3) card type (bank card, credit card, or unknown because card uninitialized); and (4) card identifier.

During subsequent use of the personal finance organizer, each time one of the financial cards 11a 11b 11c is removed from the slots 34a 34b 34c, the "Transaction Routine" is initiated by the microcontroller. The "Transaction Routine" consists of arithmetical operation for updating card variables (balance, and total credit) and valued entered by the operator during transaction session whereby deposits or purchases made that affect the particular financial card 11a 11b 11c are input and the resulting values are stored in the card data structures in the RAM.

The microcontroller 24 has an active mode and a stop mode. The software also contains a "Delay Routine" which switches the microcontroller 24 to the stop mode if no operation has been performed in order to reduce the power consumption and increase battery life. The "Delay Routine" used in the preferred embodiment of the personal finance organizer, is set to initiate stop mode after three minutes.

Finally, the personal finance organizer also includes a "Contact Sensors Status Routine" which monitors the contact pin 38 and contact sensors 28. When one of the financial cards 11a 11b 11c has been removed from the slots, then the data from the corresponding card data structures are loaded and displayed. This is facilitated by means of a "Card Removal Interrupt Routine" which starts the microcontroller 24 if it is in stop mode, and one of the financial cards 11a 11b 11c is then removed. If two or more financial cards 11a 11b 11c have been removed the program processes an error condition and an error message will be displayed.

When a financial card 11a 11b 11c has been removed from its slots 34a 34b 34c, and therefore the corresponding card data have been loaded and displayed, and the "C" key is pressed for five seconds, all the variables according to that card 11a 11b 11c are set to "O". The card in question must then be initialized according to the "Card Initialization Routine".

The hardware, software, and related configurations described herein, allow the personal finance organizer to be operated by a user as follows.

First, by means of the "Card Initialization Routine", the user enters the current balance or credit limit by using the appropriate numbers; and the "C" button is used if an error is made; "+" key is used to input such balance.

Second, by means of the "Transaction Routine", the user updates the balance or credit limit in regard to one particular card 11 by inputting an amount and then pressing the "+" key to indicate a deposit or credit payment, or pressing the "−" key to indicate a debit or a credit charge. For example, in using a VISA card 11a having a limit of one thousand dollars; if purchasing an item for one hundred dollars, the user retracts card 11a from the body 10. This causes contact arm 40a to contact the contact pin 38 and thus microcontroller 24 displays the one thousand dollar credit balance from memory. The user then inputs the one hundred dollar purchase with the appropriate numeric keys and then pressing the "−" key. As a result the new credit limit is displayed by the LCD 12. The user then reinserts card 11a into slot 34a thereby storing card 11a commanding the microcontroller 24 to enter stop mode. Thereafter the same or different card can be used in the same manner.

The embodiment in the invention depicted in FIG. 1 does not provide for a data output port for establishing an electrical connection with external equipment such as a printer or a computer, however, the personal finance organizer could be adapted, with the necessary modifications to its constituent elements, to further include a connecting terminal.

Various embodiments of the invention have now been described in detail. Since changes in and/or additions to the above-described best mode may be made without departing from the nature, spirit or scope of the invention, the invention is not to be limited to said detail.

We claim:

1. An apparatus for organizing data associated with each of a plurality of credit card means comprising:
   (a) microcontroller;
   (b) memory for storing said data associated with each said card means;
   (c) selecting means for selecting data from said memory associated with each said credit card means;
   (d) input means; wherein said input means communicates with said microcontroller to:
      (i) store data to said memory for each said credit card means; and
      (ii) track changes to said data for each said credit card means
   in a first operable position when each said credit card means is in a retracted position respectively.

2. An apparatus as claimed in claim 1 wherein said selecting means comprises a contact pin and a plurality of contact arms that are biased to contact said contact pin when one of said cards is in a retracted position.

3. An apparatus as claimed in claim 1, wherein said memory comprises a plurality of data structures each of which corresponds to one of said credit card means.

4. An apparatus as claimed in claim 3, wherein said selecting means comprises a contact pin, plurality of contact arms, and spring mechanism wherein said contact arms and spring mechanism are operably associated and present means for engaging said contact pin, and wherein said contact arms, contact pin, and circuit connection present means for communicating with said microcontroller.

5. An apparatus as claimed in claim 4, further including a compartment for storing said plurality of credit card means having a plurality of slots disposed within said compartment for slideably receiving said plurality of credit card means.

6. An apparatus as claimed in claim 5, further including circuit connection having a plurality of contact sensors for communication with said microcontroller.

7. An apparatus for accessing, processing, and storing data related to a plurality of credit card means comprising:
   (a) a body;
   (b) compartment having a plurality of slots disposed within said compartment for slidably receiving said plurality of credit card means respectively;
   (c) calculator comprising;
      (i) a display; and
      (ii) circuit for performing mathematical functions;
   (d) memory comprising a plurality of data structures for storing data associated with said plurality of credit card means;
   (e) selecting means for selecting one of said data structures disposed within said slots and engageable by said credit card means comprising:
      (i) a contact pin;
      (ii) plurality of contact arms disposed in said slots; and
      (iii) spring mechanism;
   wherein said contact arms, contact pin, and spring mechanism are operably associated and present means for engaging said contact pin when one of said financial cards is slidably removed from one of said slots;
   (f) circuit connection; and
   (g) microcontroller;
   wherein said calculator, memory, selecting means, and microcontroller are disposed within said body and are operably associated by means of said circuit connection, and said selecting means when engaged by said credit card means commands said microcontroller by means of said circuit connection to access financial data stored in one of said data structures and to display the same on said display; and said calculator, microcontroller, memory and circuit connection present means for performing mathematical functions using said financial data stored in one of said data structures, displaying the financial data resulting from said mathematical functions on said display, and storing said financial data in the originating data structure.

8. Apparatus as claimed in claim 7, wherein said circuit connection further includes a plurality of contact sensors for communicating to said microcontroller which of said financial cards are stored in said slots.

9. A method for processing and accessing data related to a plurality of cards comprising:
   (a) slidably inserting a plurality of cards into a compartment disposed in a body, said compartment comprising a plurality of slots for slidably receiving said cards respectively;
   (b) selecting one of a plurality of data structures corresponding to each said card by means of a selecting means, circuit connection, and microcontroller wherein said selecting means comprises terminal elements presented by said slots for electrical contact with said microcontroller in association with a common contact, where each said card is retracted from said slots;
   (c) inputting data related to each said card into one of said corresponding data structures by means of a input means, circuit connection, and microcontroller; and
   (d) accessing data related to said cards from one of said data structures by means of said selecting means, circuit connection, memory, and microcontroller by retracting one of said plurality of cards from said compartment.

10. An apparatus for organizing data associated with each of a plurality of cards comprising:
   (a) a holder for storing a plurality of cards comprising a plurality of corresponding slots within said holder for slidably receiving said cards and permitting said cards to be slidably retracted from said plurality of slots;
   (b) microcontroller;
   (c) memory for storing said data associated with each said card;
   (d) selecting means for selecting data from said memory associated with each said card comprising: terminal elements presented by said slots for electrical contact with said microcontroller in association with a common contact; and
   (e) input means; wherein said input means communicates with said microcontroller in co-operation with said selecting means to:
      (i) store data to said memory for each said card; and
      (ii) track changes to said data for each said card in a first operable position when each said card is retracted from said slots respectively.

11. An apparatus for organizing data associated with each of a plurality of cards as claimed in claim 10, wherein said terminal elements comprise contact closing means biased to contact said common contact.

12. An apparatus for organizing data associated with each of a plurality of cards as claimed in claim 11, wherein each said contact closing means contacts said common contact when each said card is retracted from said slots.

13. An apparatus for organizing data associated with each of a plurality of cards as claimed in claim 12, wherein each of said terminal elements is a contact arm and said common contact is a contact pin.

14. An apparatus for organizing data associated with each of a plurality of credit card means comprising:
   (a) a holder for storing said plurality of credit card means comprising a plurality of corresponding slots within said holder for slideably receiving said credit card means and permitting said credit card means to be slideably retracted from said slots;
   (b) microcontroller;
   (c) memory for storing said data associated with each said credit card means;
   (d) selecting means for selecting data from said memory associated with each said credit card means comprising: a contact pin and plurality of contact arms that are each biased to contact said pin when each said card is retracted from;
   (e) input means; wherein said input means communicates with said microcontroller in co-operation with said selecting means to:
      (i) store data to said memory for each said credit card means; and
      (ii) track changes to said data for each said credit card means in a first operable position when each said credit card means is retracted from said slots.

15. An apparatus for organizing data associated with each of a plurality of credit card means as claimed in claim 14 wherein said memory comprises a plurality of data structures each of which data structures corresponds to one of said credit card means.

16. An apparatus for organizing data associated with each of a plurality of credit card means as claimed in claim 15, further comprising:
   (a) a calculator operably associated with said microcontroller comprising:
      (i) a display; and
      (ii) circuit for performing mathematical functions wherein said calculator presents means for performing mathematical functions using said data for each said credit card means.

17. An apparatus as claimed in claim 16, further including a contact sensor disposed between said microcontroller and said contact pin to provide input to said microcontroller concerning the identity and number of credit card means retracted from said slots.

\* \* \* \* \*